(12) United States Patent
Blomqvist et al.

(10) Patent No.: US 10,145,107 B2
(45) Date of Patent: Dec. 4, 2018

(54) METHOD OF PRODUCING A PLATE-LIKE CONSTRUCTION WITH A DOUBLE-WALL STRUCTURE

(71) Applicant: Uponor Infra Oy, Vantaa (FI)

(72) Inventors: Gunnar Blomqvist, Vaasa (FI); Ari Sillanpää, Vaasa (FI); Henry Södergård, Vaasa (FI); Ted Taylor, Mississauga (CA)

(73) Assignee: Uponor Infra Oy, Vantaa (FI)

( * ) Notice: Subject to any disclaimer, the term of this patent is extended or adjusted under 35 U.S.C. 154(b) by 974 days.

(21) Appl. No.: 14/351,580

(22) PCT Filed: Oct. 17, 2012

(86) PCT No.: PCT/FI2012/050999
§ 371 (c)(1),
(2) Date: Apr. 14, 2014

(87) PCT Pub. No.: WO2013/057373
PCT Pub. Date: Apr. 25, 2013

(65) Prior Publication Data
US 2014/0248470 A1    Sep. 4, 2014

(30) Foreign Application Priority Data
Oct. 17, 2011    (FI) ..................... 20116026

(51) Int. Cl.
*B29C 65/06* (2006.01)
*B60J 10/00* (2016.01)
(Continued)

(52) U.S. Cl.
CPC .................. *E04C 2/40* (2013.01); *B23K 9/02* (2013.01); *B23K 20/129* (2013.01); *B29C 65/00* (2013.01);
(Continued)

(58) Field of Classification Search
CPC ..... B29C 65/02; B29C 65/0672; B29C 65/22; B29C 65/226; B29C 65/42; B29C 65/425;
(Continued)

(56) References Cited

U.S. PATENT DOCUMENTS 3,279,971 A * 10/1966 Gardener .......... B05C 17/00516
156/304.3
3,802,987 A    4/1974 Noll
(Continued)

FOREIGN PATENT DOCUMENTS

DE           19810856 A1    9/1999
EP           0893189 A2 *   1/1999 .......... B23K 20/122
(Continued)

*Primary Examiner* — Philip C Tucker
*Assistant Examiner* — Brian R Slawski
(74) *Attorney, Agent, or Firm* — Seppo Laine Oy

(57) ABSTRACT

A method of producing a plate-like construction having a double-wall structure and its use. According to the present invention, several elongated profiles which have essentially straight central axes are arranged against each other in such a way that adjacent hollow profiles abut each other and together form, in general terms, a flat stack having two opposite sides. The hollow profiles are welded together in order to join them with welded seams, in which case the welding is essentially carried out simultaneously from both sides of the stack. Besides good flexural strength and the opportunity to recycle, thermoplastic plates which are produced by means of the present method exhibit resistance to corrosion, decay and mould.

19 Claims, 4 Drawing Sheets

(51) Int. Cl.

| | |
|---|---|
| *B29C 65/00* | (2006.01) |
| *B23B 37/00* | (2006.01) |
| *B32B 38/04* | (2006.01) |
| *C09J 5/00* | (2006.01) |
| *C08J 5/00* | (2006.01) |
| *B32B 1/00* | (2006.01) |
| *B32B 3/12* | (2006.01) |
| *B32B 3/20* | (2006.01) |
| *E04C 2/40* | (2006.01) |
| *B29C 65/42* | (2006.01) |
| *B29C 65/48* | (2006.01) |
| *B29C 65/54* | (2006.01) |
| *B29C 65/02* | (2006.01) |
| *B29C 65/52* | (2006.01) |
| *B23K 9/02* | (2006.01) |
| *B23K 20/12* | (2006.01) |
| *B29C 65/20* | (2006.01) |
| *B29L 31/30* | (2006.01) |
| *B29L 31/00* | (2006.01) |
| *B23K 101/04* | (2006.01) |

(52) U.S. Cl.
CPC .............. *B29C 65/02* (2013.01); *B29C 65/42* (2013.01); *B29C 65/4815* (2013.01); *B29C 65/525* (2013.01); *B29C 65/542* (2013.01); *B29C 66/1122* (2013.01); *B29C 66/345* (2013.01); *B29C 66/524* (2013.01); *B29C 66/72523* (2013.01); *B29C 66/73921* (2013.01); *B29C 66/836* (2013.01); *B29C 66/8432* (2013.01); *B23K 2101/045* (2018.08); *B29C 65/06* (2013.01); *B29C 65/20* (2013.01); *B29C 66/00141* (2013.01); *B29C 66/022* (2013.01); *B29C 66/0242* (2013.01); *B29C 66/5227* (2013.01); *B29C 66/71* (2013.01); *B29C 66/721* (2013.01); *B29C 66/723* (2013.01); *B29C 66/73941* (2013.01); *B29L 2031/307* (2013.01); *B29L 2031/776* (2013.01); *Y10T 156/1002* (2015.01); *Y10T 428/24744* (2015.01)

(58) Field of Classification Search
CPC ............ B29C 65/4815; B29C 66/5227; B29C 66/72523; B29C 47/0028
USPC ... 156/60, 73.5, 196, 221, 222, 242, 244.11, 156/244.13, 244.24, 272.2, 273.9, 274.4, 156/274.6, 275.1, 290, 291, 296, 305, 156/308.2, 308.4, 309.6; 428/174, 178, 428/188, 189
See application file for complete search history.

(56) References Cited

U.S. PATENT DOCUMENTS

| | | | |
|---|---|---|---|
| 4,536,997 A | 8/1985 | Heescher | |
| 4,952,450 A | 8/1990 | Noel | |
| 5,591,292 A * | 1/1997 | Blomqvist | ............. B29O 53/78 156/244.13 |
| 2004/0004109 A1* | 1/2004 | Aota | .................... B23K 20/122 228/112.1 |
| 2005/0263244 A1* | 12/2005 | Henderson | .......... B29C 47/0028 156/304.6 |
| 2011/0127262 A1* | 6/2011 | Jansson | .................. B65D 88/26 220/62.22 |

FOREIGN PATENT DOCUMENTS

| | | |
|---|---|---|
| EP | 0893189 A2 | 1/1999 |
| JP | 2008214865 A | 9/2008 |
| WO | WO2007039073 A1 | 4/2007 |

* cited by examiner

METHOD OF PRODUCING A PLATE-LIKE CONSTRUCTION WITH A DOUBLE-WALL STRUCTURE

The present invention relates to a method of producing plate-like constructions having a double-wall structure and good flexural strength, according to the preamble of Claim 1.

The present invention also relates to plastic plates according to the preamble of Claim 24 and the use of such plastic plates.

Rigid plates for different structural purposes usually consist of thin solid plates which are stiffened by beams, such as beams having an L- or I-shaped cross-section or similar form. The plate constructions are made by cutting out large plates and then modifying them by means of flexurally rigid beams of the abovementioned type. A typical double wall construction therefore comprises two rigid plates arranged at a distance from each other and which form the surfaces of the construction and which are joined by intermediate, longitudinally or transversely running beams. In sandwich structures, stiffening layers of beehive structure are also used.

The source materials used include for example fibre material such as wood sheets or veneer sheets having intermediate beams of wood or wood composite, and sheets of metal, such as steel and aluminum, having intermediate beams of the corresponding material.

In technical applications, thermoplastic materials have several advantages over wood and metal, particularly with regard to for example recycling and resistance to corrosion and decay caused by microorganisms. Therefore, for example tank constructions in corrosion-resistant applications are coated in a separate production stage with polymeric materials.

To date, larger structures which are entirely or mainly comprised of thermoplastic material have not been available for construction purposes.

Double-wall structures of small dimensions can be manufactured from plastics by using wide extrusion tools. In this case, however, a separate tool is required for each individual plate geometry. It is also possible to produce isolated plates by making laminates which are composed of foam or other spacer material in the middle and rigid sheets forming the surfaces. Plates possessing functional properties are produced by lining standard sheets with a thin layer of a special material.

If, in practice, you want to produce polymeric double-wall plates of substantial dimensions out of thermoplastic material by means of extrusion, it is not possible to make such double-wall constructions thick enough because only a limited amount of heat can be removed from the beams binding together the surface layers in these double-wall constructions. Because it is not possible to cool the beams quickly under controlled conditions, it is very difficult to produce rigid plates, for example, having consistent quality and thus strength specific properties. The uneven and slow dissipation of heat makes production costs uneconomic and leads to unfavourable internal stresses in the material and hence to twisted and curved plates.

The purpose of the present invention is to eliminate at least some of the disadvantages associated with the prior art and to generate new plate-shaped structures out of different materials, including thermoplastics, which plate-shaped structures have high flexural rigidity and which can be produced by means of an uncomplicated method.

The present invention is based on the idea that several elongated hollow profiles are arranged in parallel, in the same plane, in such a way that the adjacent hollow profiles abut each other and together form, in general terms, a flat, upright stack having two opposite sides. Thereafter, the hollow sections are joined. For this purpose, the hollow profiles are welded together so that adjacent hollow profiles are joined by welded seams, in which case a rigid structure is achieved. The welding is carried out simultaneously from both sides of the stack.

Therefore, a plastic plate according to the present invention exhibits several elongated hollow profiles having an essentially straight central axis, which tube profiles abut each other and together form a rigid plate.

Such a plate can be used for a wide variety of structural applications, for example as an element in the production of two and three dimensional constructions.

More specifically, the method according to the present invention is characterised by what is stated in the characterising part of Claim 1.

The plastic plate according to the present invention is characterised by what is stated in the characterising part of Claim 24 and use of the plastic plate by what is stated in Claims 25 and 29.

Considerable advantages are achieved with the present invention. The double-wall structure can be made of identical parts merely by a process of welding. Because the welded seam is placed on the surface of the construction, it is easy to check the quality of the welding. By contrast, it is difficult to weld stiffening elements from inside a conventional double-wall structure of the type described in the introduction is difficult, as is a final inspection of the welded seam. The present manufacturing process, which uses uniform heating of the material around the seal areas, avoids also thermal stresses, which might twist the sheet.

The present invention also avoids any sheet-twisting caused by thermal stresses associated with the present manufacturing process which uses uniform heating of the material around the seal areas.

The hollow profiles of the double-wall structure can be filled for instance with reinforcement or concrete mass to modify the weight or rigidity. The cavities act as conduits for electrical wiring and even as pipes for liquid media. By using hollow profiles of different colours, striped structures can be constructed.

The present invention can be applied to the manufacturing of rigid plates of different materials, including metals and polymers. According to a preferred embodiment, double-walled plates are made of thermoplastics by welding the corresponding tube profiles. Such structures are particularly advantageous in several respects. In addition to good flexural strength and the opportunity to recycle, thermoplastic sheets exhibit good resistance to corrosion, decay and against mould. Because the structures are composed of tube profiles, they are durably coloured and protected against UV. The structure is easy to repair or modify, and in relation to its mechanical properties, the weight is low.

In the following, preferred embodiments will be examined more closely with the aid of the accompanying drawings.

FIG. 1a shows a side view and FIG. 1b a corresponding top view;

Figure 3:
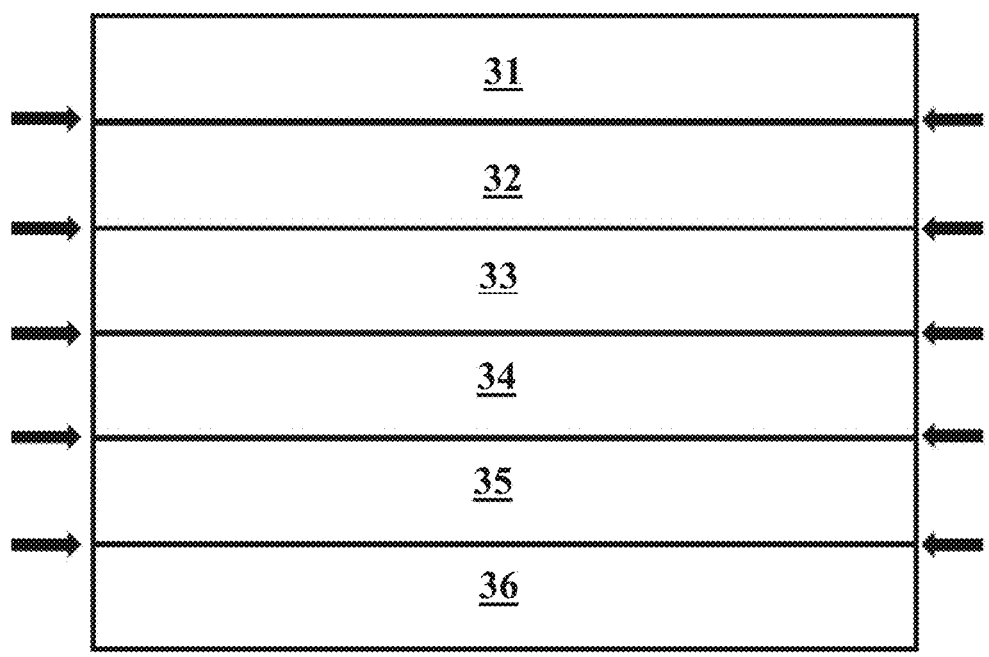

FIG. 3 indicates the welding directions of a clamped stack from the front; and

Figure 4A:
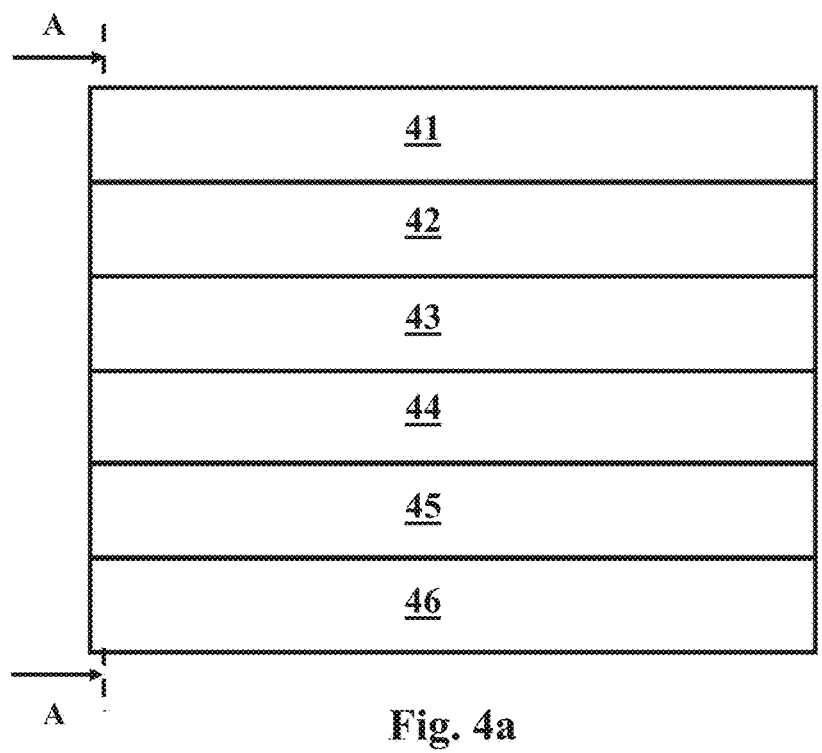
Figure 4B:
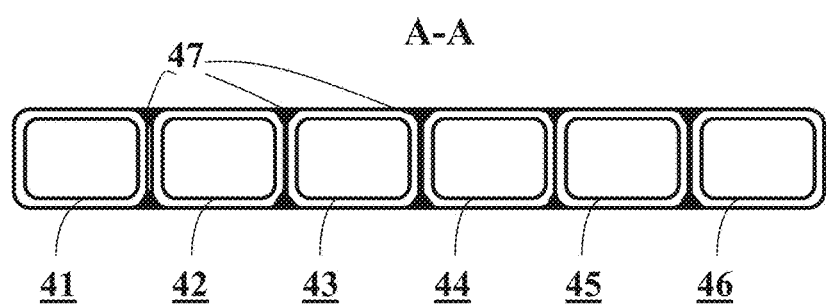

FIGS. 4a and 4b show a welded stack having welded seams from the front (FIG. 4a) and in cross-section from the side (FIG. 4b).

As explained above, the present technology initially comprises a method for producing double-wall structures by joining several hollow profiles which are arranged side by side or stacked one upon the other in such a way that a smooth horizontal row or a vertical stack is obtained (in the following, "stack" is used in both cases). Preferably, the stack is arranged in an upright position.

Preferably, the hollow profiles have parallel central axes and they are so straight that they can be pressed against each other along their full length. Therefore, the stack of hollow profiles has two large, typically flat, opposite sides parallel to the central axes. The widths of the flat sides correspond to the combined width of all hollow profiles.

The plate-shaped structure is typically composed of hollow profiles made of thermoplastic material, materials of thermosetting plastics or metal. The accompanying drawings, which are described in more detail in the following, show different embodiments for the production of double-wall structures of thermoplastic material, which represents a particularly preferred embodiment.

The term "plate", as used herein, means a mainly flat object which is limited in size and of which two dimensions are essentially larger than its third dimension. In practice, this means that the side of the object is much larger than its thickness.

Typically, these plates exhibit a ratio between the area of one of its flat sides and the thickness of the plate, that is more than 50 [length units$^2$]: 1 [length unit], in particular approximately 75-100,000 [length units$^2$]: 1 [length unit], typically approximately 100-50,000 [length units$^2$]: 1 [length unit].

The following description, however, applies *mutatis mutandis* to the production of the present double-wall structure of other materials.

Figure 1A:
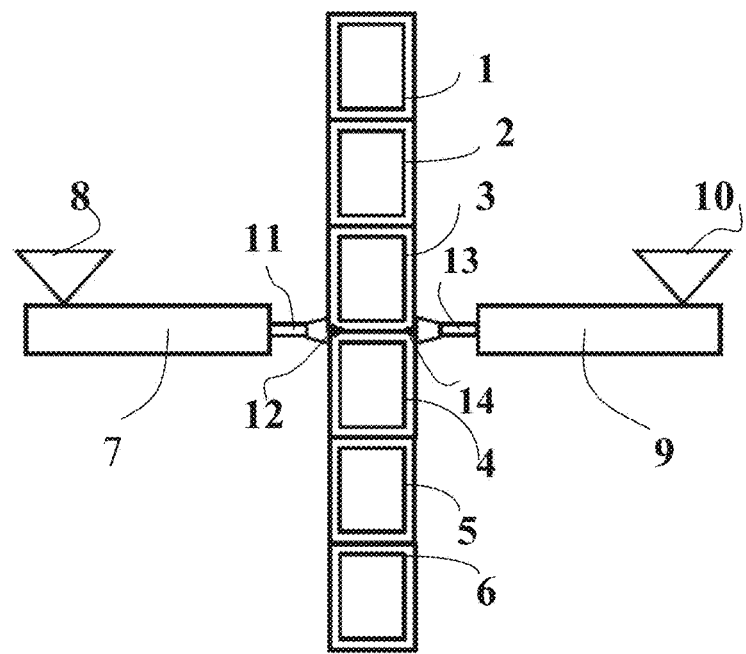
FIGS. 1a and 1b show schematically how extrusion welding of tube profiles can be carried out according to an embodiment of the present invention, in which case
Figure 1B:
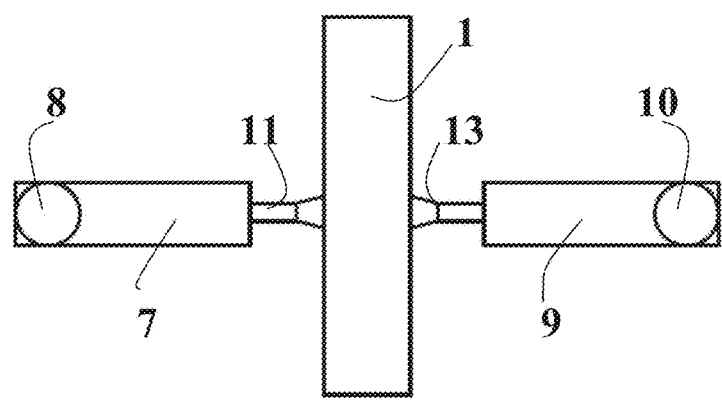

FIGS. 1a and 1b show an upright stack comprised of hollow profiles. In the figures, the stack comprises six thermoplastic tube profiles each of which has a cross-section that is typically rectangular. Their reference numbers are 1 to 6.

Generally, the number of tube profiles varies freely from 2 to 100, typically 2 to 50 or 3 to 30, depending on the predetermined width of the double-wall structure.

The stack is rendered immovable, which can be achieved for instance in such a way that adjacent hollow profiles are clamped together at each end of the hollow profiles. Another possibility is to arrange the hollow profiles in a separate frame which temporarily holds them together.

According to a preferred embodiment, the welding of the stack is carried out as extrusion welding, by using welding nozzles which are arranged on opposite sides of the profile stack, and which are coupled to a source of molten thermoplastic material. This is shown in detail in FIGS. 1a and 1b, where the reference numbers 7, 8 and 11, and 9, 10 and 12, respectively, relate to two welding devices (extrusion welding sets) consisting of extruders with screws 7, 9 and hoppers 8, 10, which feed molten plastic mass through a nozzle 11, 13 into the seam between adjacent hollow profiles 3, 4, so as to form two welds 12, 14.

The same seam is simultaneously welded from opposite directions. This solution avoids the generation of uneven heating of the material. For this purpose, the extrusion welding sets 7, 8, 11; 9, 10, 12 in FIGS. 1a and 1b are symmetrically arranged on each side of the tube profile stack.

FIG. 3 shows a similar stack of tube profiles 31 to 36, which are horizontally stacked. The directions in which the welding moves are indicated by arrows. The relative movement between the stack and the welding apparatus can be achieved in various ways. In a first embodiment, the welding is carried out using fixed welding nozzles by moving the stack longitudinally, i.e. along the central axes of the hollow profiles. For this purpose, the stack can be arranged on a conveyor which is able to move the stack horizontally past the welding nozzles. However, it is also possible to carry out the welding by using movable welding nozzles which move longitudinally (horizontally) along the stack.

In a similar way, the welding of a stack of tube profiles, which are placed in an upright position (in which case the seams between the profiles are vertical), is carried out by bringing the welding nozzles in a vertical direction or by moving the stack vertically or horizontally, in the case that the welding nozzles are fixed.

After a seam is welded, the welding place is moved to the next seam. According to a preferred embodiment, in which the stack is arranged with horizontal seams between the profiles, the welding place is moved down to the next seam.

In a preferred embodiment, the seam surface is separately prepared before the welding to ensure a good welding quality. This can be done for example by mechanically working the seam in an initial sweep along the stack, and then by adding the molten plastic mass in a second sweep. The preparation removes any dirt or oxidised surface layer from the welding surfaces.

It is also possible to supply radiant heat or convection heat (e.g. by way of hot air) to the seam from a separate nozzle simultaneously with the welding of the previous seam. Preferably, the seam is preheated simultaneously from both sides.

It is particularly desirable to separately heat the material in the seam edges prior to welding, preferably to a temperature above approximately 50° C. For this purpose, it is possible to use an infrared heater. Suitably, the extrusion welding apparatus is equipped with a nozzle for blowing hot air onto the welding place immediately before welding.

If the hollow profiles comprise surface layers of various materials (e.g. functional layers on one side, see below), it is appropriate to use different welding materials on different sides.

Figure 2A:
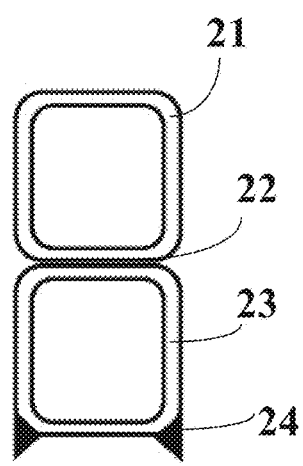
FIGS. 2a and 2b show laterally the cross-section of structures of two different embodiments.
Figure 2B:
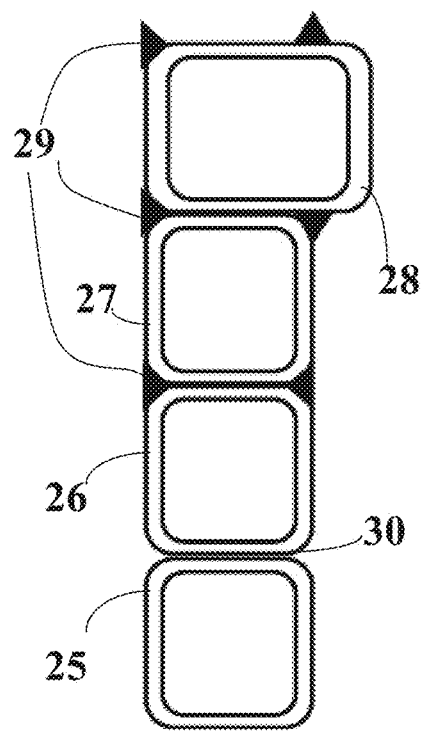

FIGS. 2a and 2b show the use of different profiles for forming a double-wall structure. FIG. 2a shows the assembly of typically rectangular, identical profiles 21, 23, in which case plastic melt is injected into the seams 22, 24, which melt can build up welding excrescenses 24 which have more or less a wedge-shaped cross-section.

According to a preferred embodiment, the welding excrescence is shaped to the adjacent surface so as to produce a welded seam which, together with the side of the tube profile, forms an essentially flat and smooth surface of the plate.

Thus, the structures in FIG. 2a show two essentially parallel, smooth surfaces.

FIG. 2b shows a corresponding structure in which the tube profiles 25, 26, 27 and 28 together form a flat surface on one side of the stack. The profiles are joined in the same way as above, with sealing compound in the seals 30 and melt in the excrescenses 29. Three of the hollow profiles 25 to 27 are identical, whereas one is wider 28. The wider profile gives a greater flexural rigidity in the longitudinal direction of the profiles and in the direction of the structure, and thus forms a kind of reinforcing element for the entire construction.

Generally, the present double-wall structures are produced by using hollow profiles which comprise tube profiles, preferably hollow profiles of a thermoplastic material, which comprises one or more layers.

Thermoplastic tube profiles are welded by using a thermoplastic material, suitably the same thermoplastic material which the tube profiles are composed of.

The term "profile" is used interchangeably with "tube" (i.e. an elongated object that has an open cross-section).

The thermoplastic profile is composed of 1 to 5 layers. According to one embodiment it contains several layers, in which case one of these forms the inner layer of the profile, and one the outer layer of the profile. Mainly in cases where a multi-layer wall comprises functional layers, it is preferable to arrange the functional layer separately in the outer wall (e.g. a conductive layer) or in the inner wall (e.g. a layer with good wear resistance). Typically, the hollow profile comprises mainly or entirely conventional thermoplastic, such as a polyolefin, such as polyethylene, especially HD-PE, or polypropylene, polyacrylonitrile-butadiene-styrene (ABS), polyamide (PA) or another thermoplastic material.

Possible functional layers can comprise ultra-high molecular weight PE (UHMWPE) or for example antistatic material. A material of the latter type can be comprised of a thermoplastic material which has been made permanently conductive. In this case, the thermoplastic material can be the same as that which is used in the core layer of the tube profile. Having this arrangement achieves good compatibility between the layers.

The cross-section of the tube profiles is typically rectangular, in which case the abutting sides of the tube profiles constitute at least 1/10 of the jacket surface of the tube profiles.

The term "rectangular" also includes such cases where the cross-sections of the tube profiles are quadratic or essentially quadratic.

The ratio of the width to the height of the tube profiles is preferably 1:1-1:10, in which case the ratio between the minimum thickness of the tube wall and the height of the cross-section of the tube profile is in particular approximately 1:100-1:4, especially approximately 1:50-1:5.

In a preferred embodiment, plastic profile types are used which can also be used for manufacturing of plastic tubes by spiral winding. Such plastic profiles are described in, among others, U.S. Pat. Nos. 5,127,442, 5,411,619, 5,431,762, 5,591,292, 6,322,653 and 6,939,424.

Typically, the surfaces of the tube profiles are smooth. However, part or all of the tube profiles may be rib-reinforced, in particular they may exhibit one or more longitudinal ribs on the inside or outside or on both sides of the tube profile. In the case where the tube profiles are made of a thermoplastic, reinforcement ribs, if used, are preferably made of the same material.

FIGS. 4a and 4b show a finished plate which consists of six essentially quadratic tube profiles 41 to 46, which are welded together to form a uniform, dense plate, by using molten thermoplastic material in the seams 47. In the figures, the profiles are joined together along the narrower side walls. A stiffer but narrower structure is achieved by turning the profiles 90 degrees and joining them together along the wider side walls.

The type of plate shown in FIGS. 4a and 4b is straight and rigid. However, it can be shaped to exhibit a curved shape, such as an arch structure, and this curved shape can be rendered permanent.

The present plate is self-supporting at span widths of up to 5,000 mm when transverse to the central axes of the tube profiles and up to 20,000 mm in the direction of the central axes.

A plastic plate of the type described above can be used as an element in the manufacturing of composite structures. Such a plastic plate can be cut to predetermined dimensions prior to manufacturing of the composite structure.

However, the plastic plate can be joined together with other similar plastic plates in order to form large uniform flat surfaces which are composed of several individual plastic plates. Such flat surfaces may be used as protective barriers, for example as wall surfaces in community building, noise barriers and protective barriers at roadsides, as shock-absorbing surfaces in port facilities and as base slabs in constructions.

Other fields of application, which are described in more detail in our parallel patent application entitled "Three-dimensional constructions", comprise different three-dimensional structures, typical examples of which are tanks, containers and similar spaces in which a rigid plastic plate according to the present invention is a self-supporting element. The three dimensional structure may include a tank end which is a rigid sheet, a horizontal tank in the form of a partition wall in horizontal or vertical tanks, or in the form of a tank end in an upright tank, which may be balanced and reinforced, for example with concrete or reinforcing bars.

It is also possible to build up constructions by combining the present straight plates with corresponding plates that are shaped into arched structures. An example of such constructions is an open culvert.

A particular field of application is heat exchangers for air/gases, and heat exchangers for water/liquids. In these applications, it is possible to take advantage of the fact that the rigid plates exhibit a large number of parallel cavities.

Another particularly interesting field of application includes straight and arched plates for boat building, decks and hulls.

In the case where the plates are made of thermoplastics, the joining of several plates to larger three-dimensional units can be achieved by welding, usually after first bevelling the edges of the sheets to be joined.

Generally, by means of the present method it is possible to produce plates whose flat surfaces have dimensions (height×length) ranging from approximately 100 mm×100 mm to approximately 10,000 m×20,000 m. Typical maximum dimensions of the plates are approximately 7,500 mm×5,000 mm, especially approximately 5,000 mm×3,500 mm, and the minimum size is approximately 500 mm×1000 mm.

In the embodiments according to FIGS. 1 to 4, the joining of hollow profiles is carried out by using extrusion welding. However, it is possible in a similar manner to weld together the hollow profile stack (also) by other welding techniques such as friction stirring, hot-wedge welding, vibrating wedge welding, or by using MIG or TIG welding.

The invention claimed is:

1. A method of producing a plate-like construction having a double-wall structure, comprising the steps of:
arranging several elongated hollow profiles of thermoplastic material, having essentially straight central axes in such a way that adjacent elongated hollow profiles abut each other and together form a flat stack with two opposite sides, and
welding the elongated hollow profiles together by joining the elongated hollow profiles together by means of welded seams, the welding being carried out essentially simultaneously from the two opposite sides of the flat stack, wherein the welding is carried out as extrusion welding using welding nozzles which are arranged on opposite sides of the flat stack, and each of the welding nozzles being connected to a source of molten thermoplastic material, and the welding using the same thermoplastic material as that which forms the elongated hollow profiles wherein the elongated hollow profiles used are tube profiles and exhibit a substantially rectangular cross-section.

2. The method according to claim 1, wherein the same seam is welded simultaneously from the two opposite sides of the flat stack.

3. The method according to claim 1, wherein the flat stack is arranged in an upright position on an underlay in such a way that the profiles abut each other, the central axes being essentially parallel to the underlay.

4. The method according to claim 1, wherein the welding is carried out using fixed welding nozzles by moving the flat stack longitudinally, or by moving the flat stack vertically or horizontally.

5. The method according to claim 1, wherein the welding is carried out with movable welding nozzles which are moved longitudinally along the flat stack.

6. The method according to claim 1, wherein the welding is carried out using fixed welding nozzles by moving the flat stack longitudinally.

7. The method according to claim 1, wherein the welding is carried out longitudinally, in which case a welding location is moved in a downwards direction along the flat stack after each seam is welded.

8. The method according to claim 1, wherein the flat stack of elongated hollow profiles is temporarily clamped together to form a double-wall structure before the welding is started.

9. The method according to claim 1, wherein the flat stack of elongated hollow profiles is arranged in a frame.

10. The method according to claim 1, wherein individual straight or curved plate-like constructions in the form of double-wall structures are produced.

11. The method according to claim 10, wherein a straight plate-like construction is produced which is bent so that the plated-like construction exhibits a curved shape, which is rendered permanent.

12. The method according to claim 1, wherein a welded seam is produced which, together with a side of the elongated hollow profiles, form an essentially flat and smooth surface of the plate-like construction.

13. The method according to claim 1, wherein a plate-like construction possessing two essentially parallel surfaces is produced.

14. The method according to claim 1, wherein a plate-like construction is produced in which all elongated hollow profiles are identical.

15. The method according to claim 1, wherein a plate-like construction is produced in which at least one of the elongated hollow profiles has a different cross-section, different dimensions, or a combination of a different cross-section and different dimensions from at least one of the other elongated hollow profiles.

16. The method according to claim 1, wherein a rigid plastic plate-like construction is produced.

17. The method according to claim 16, wherein the plate-like construction is self-supporting at span widths of up to 5,000 mm transverse to the central axes of the tube profiles and up to 20,000 mm in the direction of the central axes.

18. The method according to claim 1, wherein plate-like constructions are produced which are composed of 2-100 elongated hollow profiles which are parallel to each other.

19. The method of claim 1, wherein the abutting sides of the tube profiles constitute at least $1/10$ of a jacket surface of the tube profiles.

* * * * *